United States Patent
Stanhope et al.

(10) Patent No.: US 7,071,252 B2
(45) Date of Patent: Jul. 4, 2006

(54) PLASTICIZER COMPOSITIONS FOR NON-AQUEOUS PLASTISOLS

(75) Inventors: Bruce E. Stanhope, Grayslake, IL (US); William D. Arendt, Libertyville, IL (US); Jiamin Lang, Arlington Heights, IL (US)

(73) Assignee: Velsicol Chemical Corporation, Rosemont, IL (US)

( * ) Notice: Subject to any disclaimer, the term of this patent is extended or adjusted under 35 U.S.C. 154(b) by 45 days.

(21) Appl. No.: 10/660,457

(22) Filed: Sep. 11, 2003

(65) Prior Publication Data

US 2004/0132882 A1 Jul. 8, 2004

Related U.S. Application Data

(60) Provisional application No. 60/410,200, filed on Sep. 12, 2002.

(51) Int. Cl.
*C08K 5/103* (2006.01)

(52) U.S. Cl. .................................... 524/292; 524/569
(58) Field of Classification Search ........ 524/291–292, 524/569
See application file for complete search history.

(56) References Cited

U.S. PATENT DOCUMENTS

| | | | | | |
|---|---|---|---|---|---|
| 3,844,814 | A | * | 10/1974 | Bettoli et al. | 427/270 |
| 4,827,581 | A | * | 5/1989 | Davidian | 27/3 |
| 5,006,585 | A | * | 4/1991 | DiBella | 524/293 |
| 5,236,987 | A | * | 8/1993 | Arendt | 524/287 |
| 6,392,011 | B1 | * | 5/2002 | Nakamura et al. | 528/502 R |
| 2003/0023112 | A1 | * | 1/2003 | Lang et al. | 560/90 |
| 2003/0181556 | A1 | * | 9/2003 | Lang et al. | 524/295 |

* cited by examiner

*Primary Examiner*—Peter Szekely
(74) *Attorney, Agent, or Firm*—Fitch, Even, Tabin & Flannery

(57) ABSTRACT

Monoesters derived from a dihydric alcohol and a carboxylic acid such as benzoic acid are secondary plasticizers for non-aqueous and solventless plastisols containing primary plasticizers that do not contain unreacted alkanol groups.

8 Claims, No Drawings

PLASTICIZER COMPOSITIONS FOR NON-AQUEOUS PLASTISOLS

RELATED APPLICATIONS

The present application for a utility patent claims a priority date of Sep. 12, 2002, based on the filing date of Provisional Patent Application Ser. No. 60/410,200.

BACKGROUND OF THE INVENTION

1. Field of the Invention

This invention relates to plasticizers for organic polymers. More particularly, this invention relates to benzoate monoesters that are useful as plasticizers for solventless and non-aqueous plastisols containing organic polymers.

2. Description of the Prior Art

Using combinations of mono and diesters derived from benzoic acid and dihydric alcohols as plasticizers for aqueous plastisols containing organic polymers is known.

The use of diesters derived from benzoic acid and a dihydric alcohol such as ethylene glycol in combination with limited amounts of the corresponding monoesters as plasticizers for aqueous polymer emulsions, one type of plastisol, is described in the prior art. As an example of the latter, U.S. Pat. No. 5,676,742, which issued to William Arendt on Oct. 14, 1997 describes aqueous plastisols useful as latex caulks. The primary plasticizer in these compositions is a diester derived from benzoic acid and diethylene and/or dipropylene glycol. Both hydroxyl groups of the diol are esterified.

In accordance with the teaching of the aforementioned patent to Arendt, a shortcoming of caulks formed from aqueous plastisols containing dibenzoates of diethylene- and/or dipropylene glycol as plasticizers is the greater susceptibility of the final caulk to fungal attack relative to caulks prepared using the same film-forming polymer(s) and a diester of phthalic acid such as butylbenzyl phthalate as the plasticizer.

The Arendt patent teaches that even though monoesters of glycols are not considered effective plasticizers for certain applications, relatively low levels of diethylene glycol (DEG) monobenzoate and/or dipropylene glycol (DPG) monobenzoate in combination with the corresponding dibenzoate as the primary plasticizer were sufficient to improve the fungal resistance exhibited by the caulks relative to the resistance imparted by dibenzoate plasticizers without any substantial adverse effect on the processability of the plastisol.

Throughout this patent the concentrations of the glycol or diol monobenzoates in blends containing the corresponding dibenzoates are expressed in terms of a "hydroxyl number". The units for the "hydroxyl number" are understood by those skilled in the art to be milligrams of potassium hydroxide per gram of sample.

The hydroxyl numbers exhibited by the mixtures of diethylene glycol mono- and dibenzoates disclosed in the Arendt patent range from 12.1 to 58.4. This is equivalent to a concentration of diethylene glycol monobenzoate in the mixture of from 4 to 18 weight percent.

The use of the monobenzoate of 2,2,4-trimethyl-1,4-pentanediol as a plasticizer for polyvinyl chloride is described in U.S. Pat. No. 5,006,585, which issued to DiBella on Apr. 9, 1991. Because polyvinyl chloride is processed as a molten material, any adverse effect of the plasticizer on the viscosity or processability of the plastisol is not a consideration. The only criterion for the melting point of the plasticizer is that it be below the melting point of polyvinyl chloride.

Monoesters derived from benzoic acid and dihydric alcohols are highly polar compounds due to the presence of a hydroxyl group on the alcohol portion of the ester. This polarity is believed responsible for the observed limited compatibility of the monoesters with less polar polymers such as polyvinyl chloride and other halogen-containing polymers.

Diesters derived from benzoic acid or other aromatic monocarboxylic acid and dihydric alcohols such as diethylene and dipropylene glycols are very compatible with polyvinyl chloride. This high level of compatibility may increase the viscosity of a plastisol containing finely divided polymer particles and an effective concentration of the plasticizer to the extent that the composition cannot be readily processed using conventional equipment.

One approach to reducing the viscosity of plastisols containing diesters of aromatic monocarboxylic acids as the primary plasticizer has been the use of esters derived from monohydric alcohols and aliphatic monocarboxylic acids as secondary or auxiliary plasticizers. Secondary plasticizers exhibit only limited compatibility with the polymer and would be expected to reduce the viscosity of the plastisol.

The present invention is based on the discovery that monoesters derived from a dihydric alcohol and a monocarboxylic acid such as benzoic acid can be used as secondary plasticizers for non-aqueous and solventless plastisols containing primary plasticizers that include but are not limited to the aforementioned aromatic acid diesters.

An additional feature of these monoesters resides in their ability to reduce the viscosity of a plastisol while simultaneously reducing the temperature required for fusion of the dispersed polymer particles into a unitary article and remaining compatible with the polymer.

Use of the present secondary plasticizers may also impart additional advantages including but not limited to reduced cost and increased stain resistance of the final polymer composition.

The secondary plasticizers of this invention are also suitable for use with polymers in the form of solid particles that remain in this form following treatment with a plasticizer.

SUMMARY OF THE INVENTION

This invention relates to non-aqueous plastisol compositions comprising:

A. at least one organic polymer; and

B. an effective amount of a plasticizer composition comprising 1. at least one primary plasticizer selected from the group consisting of known plasticizers for said polymer containing no unreacted alkanol groups; and 2. at least one secondary plasticizer selected from monoesters derived from a monocarboxylic acid and a dihydric alcohol;

wherein the concentration of said secondary plasticizer is sufficient to reduce the viscosity and/or the hardness exhibited by said polymer composition in the presence of said primary plasticizer alone while remaining compatible with said plastisol.

DETAILED DESCRIPTION OF THE INVENTION

The Secondary Plasticizer

The secondary plasticizers of this invention are monoesters of a dihydric alcohol and a monocarboxylic acid. One hydroxyl group of the alcohol remains unreacted.

Preferred secondary plasticizers are monoesters of a dihydric alcohol an aromatic monocarboxylic acid such as benzoic acid. Suitable dihydric alcohols contain from 2 to 10 or more carbon atoms. These dihydric alcohols include but are not limited to glycols such as ethylene glycol, propylene glycol and condensation products of these glycols, including but not limited to dimers and trimers such an diethylene glycol, triethylene glycol and dipropylene glycol. Examples of other suitable dihydric alcohols are diols such as 1,4-butanediol and 1,6-hexanediol.

The secondary plasticizer is preferably a liquid at 25° C.

The Primary Plasticizer

The secondary plasticizers of this invention can be used with any of the known primary plasticizers for the polymer being modified, with the proviso that the primary plasticizer does not contain any unreacted alkanol (=COH) groups.

When the polymer is polyvinyl chloride, suitable primary plasticizers include but are not limited to:

monoesters derived from benzoic acid and a monohydric alcohol, diesters derived from benzoic acid and a dihydric alcohol, diesters derived from phthalic acid and a monohydric alcohol, and esters of phosphoric acid The only requirement for the primary plasticizer is that it be compatible with the secondary plasticizer.

Preferred primary plasticizers for polyvinyl chloride are diesters of benzoic acid and a dihydric alcohol.

Particularly preferred primary plasticizers include but are not limited to diethylene glycol dibenzoate, triethylene glycol dibenzoate, dipropylene glycol dibenzoate and mixtures containing two or more of these esters.

The present plasticizer compositions can be obtained by combining the primary and secondary plasticizers in the desired proportions with the polymer.

When the primary plasticizer is a diester derived from benzoic acid and a dihydric alcohol, the plasticizer composition can be prepared by reacting a dihydric alcohol such as diethylene glycol with an aromatic monocarboxylic acid such as benzoic acid in a molar ratio of less than two moles of acid per mole of dihydric alcohol. It should be apparent that this procedure results in a mixture of the corresponding mono- and diesters as the final product. The ratio of monoester to diester in the final product can be controlled by varying the stoichiometry and process conditions of the esterification reaction.

The Organic Polymer

Polymers that can be used with the present plasticizer compositions exhibit some degree of polarity and include but are not limited to homopolymers and copolymers obtained by the polymerization of one or more olefinically unsaturated compounds containing polar groups. Suitable monomers include but are not limited to halogenated olefins such as the haloethylenes and the isomeric halopropylenes and halobutylenes, vinyl halides such as vinyl chloride and vinyl fluoride, and halogenated ethylenically unsaturated aromatic hydrocarbons such as halostyrenes. Other suitable polymers include homopolymers and copolymers of acrylic and methacrylic acids and esters of these acids.

The present plasticizer compositions are particularly suitable for use with normally rigid halogenated polymers, including but not limited to polymers of halogenated olefins such as vinyl chloride.

The Ratio of Primary and Secondary Plasticizers

The relative concentrations of primary and secondary plasticizers present in a plastisol of the present invention will depend upon a number of variables, including but not limited to 1) the compatibility of the primary and secondary plasticizers with one another and with the polymer and 2) the properties desired both in the plastisol and the final plasticized polymer.

Depending upon the ester(s) used as the primary plasticizer, the weight ratio of primary to secondary plasticizer can range from 99:1 up to about 75:25 or higher. As the concentration at which the secondary plasticizer becomes incompatible with the polymer is approached, the efficacy of this plasticizer in reducing the viscosity of the plastisol appears to decrease.

Using a PVC plastisol and a total plasticizer content of up to 120 parts by weight per 100 parts of polymer the maximum concentration at which a secondary plasticizer of the present invention can be present in a plastisol can readily be determined by gradually increasing the relative concentration of this component of the plasticizer and noting the minimum concentration at which the monoester, which is typically a liquid at 25° C., exudes to the surface of an article that has been fabricated from the plastisol.

The optimum concentration range of secondary plasticizer for a particular plastisol is determined at least in part by the primary plasticizer and the properties desired in the final shaped article.

For preferred compositions of this invention containing a diester of benzoic acid and a dihydric alcohol as the primary plasticizer and the corresponding monoester of the same alcohol as the secondary plasticizer, the monoester constitutes from about 5 to about 20 weight percent of the total plasticizer. When the mono- and diester are prepared simultaneously, it may be more convenient to determine the relative concentration of monoester using vapor phase or gas-liquid chromatography (glc). Using a preferred blend of 1) a blend of the dibenzoates of diethylene, dipropylene and triethylene glycols as the primary plasticizer, and 2) the monobenzoate of diethylene glycol as the secondary plasticizer, the area ratio of the curves corresponding to the diesters and the monoester is from 95:5 to about 80:20, respectively.

The optimum concentration plasticizer in a plastisol is dependent on a number of variables, including but not limited to the desired viscosity of the plastisol, the conditions under which the polymer composition is processed and the physical properties of the article that is fabricated from the plastisol.

Using polyvinyl chloride, the total plasticizer concentration is typically from about 10 to about 100 percent, based on polymer weight.

The following example demonstrates the ability of the monobenzoate of a dihydric alcohol to reduce the viscosity of a polyvinyl chloride composition containing the corresponding dibenzoate and at least one additional dibenzoate as a primary plasticizer. In the example all parts are by weight unless otherwise specified.

The primary plasticizer was a blend of diethylene glycol dibenzoate (DEGDB), dipropylene glycol dibenzoate (DPGDB) and triethylene glycol dibenzoate (TEGDB). The ratio of DEGDB:DPGDB:TEGDB was 65:20:15, determined using gas/liquid chromatography (glc).

The secondary plasticizer was diethylene glycol monobenzoate (DEGMB), which was present as a mixture with 23 percent of DEGDB, determined using glc. The two samples evaluated contained 15 (sample 2) and 25 parts (sample 3) of this mixture per 100 parts of total plasticizer. A polymer sample (4) containing only the DEGMB/DEGDB mixture was evaluated for comparative purposes.

60 parts of the plasticizer composition to be evaluated were blended with 100 parts of finely divided polyvinyl chloride resin available as Lacovyl® PB 1302 from Atochem and 3 parts of a stabilizer available as Mark® CZ 116 from Crompton.

The viscosities of the resultant plastisols were measured using a Brookfield® Viscometer and shear rate measurements were obtained using a rheometer available as Model $CSL^2$ 100 from TA Instruments. The viscometer data are recorded in Table 1 and the $CSL^2$ 100 Rheometer data in Table 2. Readings were taken of each sample as initially prepared and after being allowed to remain undisturbed for one day.

TABLE 2

Brookfield ® Viscosity Response Spindle #3, 23° C.

| Sample No. | Primary Plasticizer (%) | Secondary Plasticizer (%) | 2.5 RPM | | 20 RPM | |
|---|---|---|---|---|---|---|
| | | | Initial | 1-Day | Initial | 1-Day |
| 1 | 100[1] | 0 | 2920 | 4520 | 2565 | 4135 |
| 2 | 85 | 15 | 2520 | 3440 | 2355 | 3475 |
| 3 | 75 | 25 | 2240 | 3200 | 2125 | 3480 |
| 4 | 0[1] | 100 | Too viscous to measure | | | |

TABLE 3

$CSL^2$ 100 Rheometer Viscosity Response (23° C.)

| Sample No. | Primary Plasticizer (%) | Secondary Plasticizer (%) | Shear Rate | | | | | |
|---|---|---|---|---|---|---|---|---|
| | | | 1 | | 10 | | 100 | |
| | | | Initial | 1-Day | Initial | 1-Day | Initial | 1-Day |
| 1 | 100[1] | 0 | 3.69 | 4.37 | 3.98 | 4.38 | 9.41 | 10.29 |
| 2 | 85 | 15 | 3.00 | 3.50 | 3.45 | 3.92 | 7.60 | 8.62 |
| 3 | 75 | 25 | 2.78 | 3.00 | 3.28 | 3.73 | 7.18 | 7.87 |
| 4 | 0[1] | 100 | 304.5 | 245.5 | 83.61 | 73.78 | 21.06 | 15.23 |

[1]Evaluated for comparative purposes

The data in both of Tables 1 and 2 show a significant decrease in 1-day viscosity readings when 15% of the monobenzoate mixture (equivalent to 11.55% of the monobenzoate) was added as a secondary plasticizer to the dibenzoate mixture. When the concentration of the secondary plasticizer mixture was increased to 25% (equivalent to 19.25% of the monobenzoate) the efficacy of this plasticizer in reducing viscosity was substantially diminished.

The data also show that the viscosity of a plastisol prepared using 100% of the monobenzoate composition containing only 23% DEGDB was too high for measurement using the Brookfield Viscometer. The excessive thickness of the plastisol was apparently the result of incompatibility between the polymer and the secondary plasticizer.

To determine the likelihood of compatibility between the secondary plasticizer and the polymer under a typical set of processing conditions for polyvinyl chloride, samples 1, 2, 3 and 4 were formed into strips that were covered with a layer of absorbent paper and then rolled up to form a cylinder. The cylinders were heated to a temperature of 73° C. for one day. At the end of this period the cylinders were unrolled and the paper sheets examined. The paper from the samples prepared using plasticizer samples 2 and 3 exhibited no exudation of the liquid monobenzoate plasticizer. The paper from the sample prepared using comparative plasticizer 4 containing only the monobenzoate composition, was wet following this test and was still wet several weeks later.

The invention claimed is:

1. A non-aqueous plastisol composition comprising:
  A. at least one organic polymer; and
  B. at least one primary plasticizer; and
  at least one secondary plasticizer selected from the group consisting of monoesters derived from a dihydric alcohol and an aromatic monocarboxylic acid,
  wherein said primary plasticizer is selected from the group consisting of diethylene glycol dibenzoate, triethylene glycol dibenzoate and dipropylene glycol dibenzoate and at least a portion of said secondary plasticizer is the corresponding monoester and the total of all monoesters constitutes from 5 to 20 of the total weight of said primary and secondary plasticizers.
  wherein the concentration of said secondary plasticizer is sufficient to reduce the viscosity exhibited by said plastisol in the presence of said primary plasticizer alone while remaining compatible with said plastisol.

2. A composition according to claim 1 wherein said monoester is a liquid at 25° C.

3. A composition according to claim 2 wherein said secondary plasticizer constitutes from 1 to 25 percent of the combined weights of primary and secondary plasticizers and said dihydric alcohol contains from 2 to 10 carbon atoms.

4. A composition according to claim 3 wherein said organic polymer is polyvinyl chloride.

5. A plastisol composition of claim 1 wherein the concentration of said plasticizer composition is from 10 to 100 parts by weight per 100 parts by weight of said organic polymer.

6. In an improved method for preparing a plastisol wherein said method comprises blending organic polymer with a primary plasticizer and a secondary plasticizer, the improvement comprising selecting the primary plasticizer from the group consisting diethylene glycol dibenzoate, triethylene glycol dibenzoate and dipropylene glycol dibenzoate, and selecting said secondary plasticizer from the group consisting of monoesters derived from a dihydric alcohol and an aromatic monocarboxylic acid, wherein at least a portion of said secondary plasticizer is the corresponding monoester and the total of all monoesters constitutes from 5 to 20 of the total weight of said primary and secondary plasticizers, wherein the concentration of said secondary plasticizer is sufficient to reduce the viscosity exhibited by said plastisol in the presence of said primary plasticizer alone while remaining compatible with said plastisol.

7. A method according to claim 6 wherein said polymer is polyvinyl chloride.

8. A method according to claim 6 wherein the concentration of said plasticizer composition is from 10 to 100 parts by weight per 100 parts by weight of said organic polymer.

* * * * *